US005457315A

United States Patent [19]

Wells et al.

[11] Patent Number: 5,457,315

[45] Date of Patent: Oct. 10, 1995

[54] METHOD OF SELECTIVE ION TRAPPING FOR QUADRUPOLE ION TRAP MASS SPECTROMETERS

[75] Inventors: Gregory J. Wells, Fairfield; Mingda Wang, Walnut Creek, both of Calif.

[73] Assignee: Varian Associates, Inc., Palo Alto, Calif.

[21] Appl. No.: 179,844

[22] Filed: Jan. 11, 1994

[51] Int. Cl.[6] ............................ B01D 59/44; H01J 49/00

[52] U.S. Cl. ............................ 250/282; 250/292

[58] Field of Search ............................ 250/282, 292

[56] References Cited

U.S. PATENT DOCUMENTS 4,761,545 8/1988 Marshall et al. ............ 250/282
5,134,286 7/1992 Kelley ............ 250/292
5,198,665 3/1993 Wells ............ 250/292
5,200,613 4/1993 Kelley ............ 250/292
5,302,826 4/1994 Wells ............ 250/292

*Primary Examiner*—Bruce C. Anderson
*Attorney, Agent, or Firm*—Gerald M. Fisher

[57] ABSTRACT

A power efficient selective mass range trap filling process in which the RF trapping voltage connected to the ring electrode is slowly modulated simultaneously with: (1) e-beam ionization bombardment and (2) application of a broadband supplemental waveform containing selected secular frequencies to the QIT end caps. The modulation permits the reduction of the number of frequency components required in the broadband supplemental waveform and permits elimination of absorption by ions of energy from more than one supplemental frequency component at any one time.

16 Claims, 7 Drawing Sheets

METHOD OF SELECTIVE ION TRAPPING FOR QUADRUPOLE ION TRAP MASS SPECTROMETERS

RELATED CASES

This invention is owned by the assignee of the copending continuation-in-part application, entitled Quadrupole Trap Improved Technique for Collision Induced Disassociation for MS/MS Processes, Ser. No. 08/890,996 filed May 29, 1992, now U.S. Pat. No. 5,302,826.

FIELD OF THE INVENTION

This invention relates to an improved process during ionization for filling a quadrupole ion trap with a selected range of ions of interest.

BACKGROUND OF THE INVENTION

The quadrupole ion trap (QIT) was first disclosed in the year 1952 in a paper by Paul, et al. This 1952 paper disclosed the QIT and the disclosure of a slightly different device which was called a quadrupole mass spectrometer (QMS). This quadrupole mass spectrometer was very different from all earlier mass spectrometers because it did not require the use of a magnet and because it employed radio frequency fields for enabling the separation of ions, i.e. performing mass analysis. Mass spectrometers are devices for making precise determination of the constituents of a material by providing separations of all the different masses in a sample according to their mass to charge ratio. The material to be analyzed is first disassociated/fragmented into ions which are charged atoms or molecularly bound group of atoms.

The principle of the quadrupole mass spectrometer (QMS) relies on the fact that within a specifically shaped structure, radio frequency (RF) fields can be made to interact with a charged ion so that the resultant force on certain of the ions is a restoring force thereby causing those particles to oscillate about some referenced position. In the quadrupole mass spectrometer, four long parallel electrodes, each having a highly precise hyperbolic cross sections, are connected together electrically. Both dc voltage, U, and RF voltage, $V_0\cos\omega$, can be applied across the electrodes. When an ion is introduced or generated within the spectrometer, if the parameters of the quadrupole are appropriate to maintain the oscillation of those ions, such ions would travel with a constant velocity down the central axis of the electrodes at a constant velocity. Parameters of operation could be adjusted so that ions of selected mass to charge ratio, m/e, could be made to remain stable in the direction of travel while all other ions would be ejected from the axis. This QMS was capable of maintaining restoration forces in two directions only, so it became known as a transmission mass filter. The other device described in the above mentioned Paul, et al. paper has become known as the quadrupole ion trap (QIT). The QIT is capable of providing restoring forces on selected ions in all three directions. This is the reason that it is called a trap. Ions so trapped can be retained for relatively long periods of time which supports separation of masses and enables various important scientific experiments and industrial testing which can not be as conveniently accomplished in other spectrometers.

The QIT was only of laboratory interest until recent years when relatively convenient techniques evolved for use of the QIT in a mass spectrometer application. Specifically, methods are now known for ionizing an unknown sample after the sample was introduced into the QIT (usually by electron bombardment), and adjusting the QIT parameters so that it stores only a selectable range of ions from the sample with the QIT. Then, by linearly changing, i.e. scanning, one of the QIT parameters, it became possible to cause consecutive values of m/e of the stored ions to become successively unstable and to sequentially pass the separated ions which had become unstable into a detector. The detected ion current signal intensity, as a function of the scan parameter, is the mass spectrum of the trapped ions.

The first step in every analysis of a sample in a QIT employs ionization. We have determined that an improved mass range isolation during ionization procedure can be of significant benefit in analysis.

It was recognized in the prior art that it was beneficial to reduce the range of ions retained in a QIT during ionization. The European patent 0362,432 of Franzen provides a so called supplemental broadband RF excitation voltage to the end caps of the trap during the electron bombardment ionization. The broadband voltage was to be designed to contain frequencies corresponding to the secular frequencies of all the unwanted ions that were in the trap. The intention was that the unwanted ions would absorb power from such selected frequency components and increase their secular motion and be ejected or removed by impacting the trap. Marshall, et al. patent, U.S. Pat. No. 4,761,545, teaches the application of a supplementary broad-based RF excitation signal applies to the end caps for ejecting ions where the broadband RF excitation signal is generated by an inverse Fourier Transform computation. It is also known to create the broadband waveform as disclosed in the Kelly U.S. Pat. No. 5,134,286, where filtered noise is selected to provide a waveform for exciting and ejecting the unwanted ions.

There are several disadvantages with the above-mentioned processes for ion range selection during ionization. The processes which require use of a frequency component which matches the frequency of each unwanted ion implies the knowledge of the precise secular frequency for each such ion. There are several practical reasons why this knowledge is extremely difficult, if not impossible, to obtain. The mass of an ion is not exactly an integer value and will have a "mass defect" causing its exact mass to differ from its nominal integer mass. Also, space charge effects, electronic drifts in the RF voltage and applied supplemental frequency cause mismatches, as well as physical trap imperfections. In respect to the Kelly continuum noise spectra, although this guarantees that the broadband excitation includes frequencies to match the required secular frequency, the amplifiers need to provide very high power because it is necessary to provide power at all frequencies in the noise continuum.

Furthermore, a large percentage of the power required by the Kelly technique is not used since in the lower mass range there are large differences between the secular frequency of adjacent masses. In the abstract of the Kelly U.S. Pat. No. 5,256,875, these supplemental waveforms are described as "a filtered noise signal having no missing frequency components outside of the notches of the notch filter employed to generate the filtered noise signal." This supplemental waveform is further described in the Kelly specification at column 12, line 51–58 for waveforms constructed of discrete frequencies as "The frequencies of the optimized broadband signal frequency components should be sufficiently close so as to present a substantially continuous band of frequencies to that physical system. In the embodiments of the previous paragraph, this implies that the separation df should be sufficiently small that the broadband signal presents a substantially continuous band of frequencies to the physical system."

The power inefficiency of the Kelly technique can be understood by considering the number of unused components. If an ion of m/e=32 has a secular frequency of 485 KHz, the next larger mass, m/e=33 would have a secular frequency of 429 KHz. Assuming a $\Delta f$=250 Hz in the noise waveform, there would be 224 component frequencies required between two adjacent masses. Since the range of secular frequencies typically spans 500 KHz to 10 Kz, many thousands of frequency components are dictated which would not correspond to an ion resonance.

The Franzen method (EP 362432) requires much fewer frequencies. If it were possible to exactly determine the secular frequencies, i.e. compensating for the mass defects, space charge shifts and other frequency error sources, the Franzen technique, for the mass range 10–650, would require at most one frequency for each unwanted mass to be ejected or 640 frequency components. However, since the frequency spacing of the secular frequencies of larger masses are very close, i.e. the difference between the secular frequency of m/e=400 and m/e=401 equals 100 Hz, it is clear that one supplemental frequency component can excite several adjacent secular frequencies for higher mass ions and the total number of frequency components in a frequency optimized waveform is much less than the previously mentioned 640. There is still another significant inefficiency when using frequency spacing of the frequency components in the supplemental waveform. Close spacing (df) will result in several different frequency components, with different phases, driving the same ion. A single ion driven by more than one external frequency will result in a complex beating in the amplitude of oscillation. Since the ion is to be ejected by means of increasing its amplitude until it strikes an electrode, an additional time or power is expended while undergoing a complex oscillation its amplitude before ejection.

SUMMARY OF THE INVENTION

It is an object of this invention to provide a reliable, low power method for filling a trap during electron bombardment ionization with only selected ranges of ion masses without requiring prior knowledge and computation of mass defects, and without corrections for space charge for the ions to be eliminated.

It is a further object to reduce further the number of frequencies that are required in a supplemental waveform to create a waveform containing the optimized spectrum for power efficient ejection of unwanted ions without significant simultaneous absorption of power from two adjacent frequency components by the same ion.

It is a further object to employ existing, known apparatus in a new way to achieve the selective desired filling of the trap with selected ranges of ions.

DETAILED DESCRIPTION OF THE INVENTION

In mass spectrometric analysis, especially in those instances where a sample is available in very small quantities, i.e. nanograms, it is critical that the technique be extremely efficient. To reduce the minimum discernable signal, resolution, as well as the space charge effects, we have provided a technique during ionization, selectively and efficiently with only those ions in the ranges of interest while simultaneously ejecting the other ions.

It is known that an ion trap has a certain mass stability region which depends on the trap dimension and the values of "a" and "q" according to the equations:

$$a=-8eU/mr^2_0W^2_0$$

$$q=4eV/mW^2_0r_0^2$$

where U and V are DC and AC voltage amplitude applied to the ring electrode and where e and m are respectively the electric charge and mass of charged particles. The term "r" is a fixed trap dimension. Accordingly, for any particular ion, "a" and "q" for that ion are determined by the RF trapping frequency W, the DC RF bias amplitude (U) and AC voltage amplitude (V) of the RF trapping field. For a plot of "a" versus "q," there is a region called the stability envelope. If for a given ion, the "a" and "q" both fall within the stability envelope, then it is known that the ion will remain in the trap. Since $q \alpha V/m$, it is generally understood that when the AC amplitude of the RF trapping field is increased, for a given m, that the q increases. If q moves outside the boundary of the stability diagram, then the ion will be ejected from the trap.

This process is well known and has been used simultaneously or after electron bombardment ionization, in conjunction with a scan of the RF amplitude voltage (V), to eject ions up to or near the selected ion region to be analyzed. Then, or simultaneously, in order to eliminate ions of high mass, a supplemental broadband frequency has been applied across the end cap electrodes and the frequencies of the broadband wave are nominally calculated to match the secular frequencies, $W_s=B_zW/z$, of the ions to be ejected.

Figure 4:
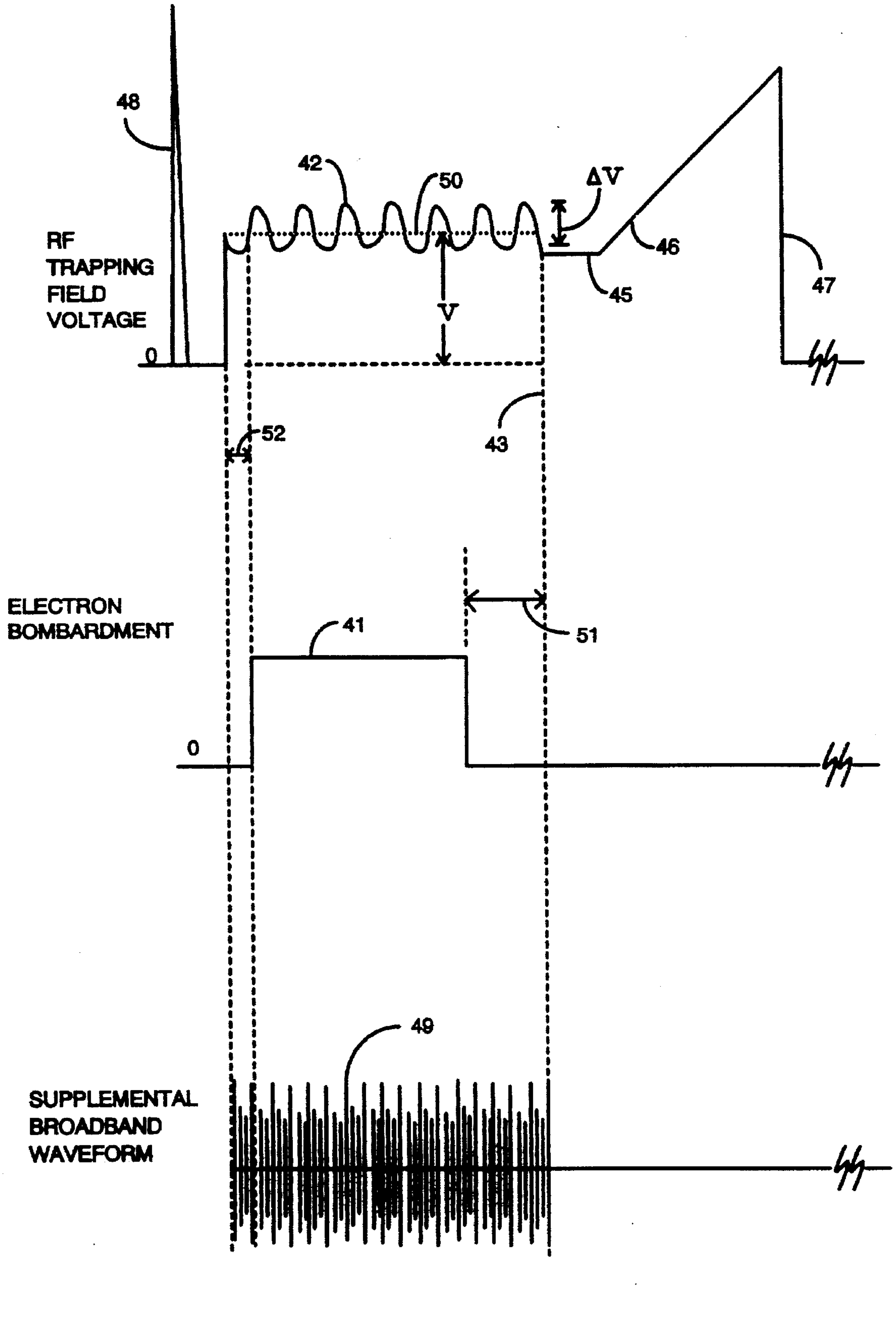
FIG. 4 is timing diagram for the method of the invention.

We have devised a method to significantly improve the filling of the trap with selected ranges of ions. With reference to FIG. 4, our method involves a new concept and can be seen to involve the simultaneous application of an RF modulation of the trapping field in addition to the prior art processes. It is previously known to employ a selected computed supplemental broadband waveform 49 excite ions produced during electron bombardment 41 of the sample gases. At the same time that the supplemental broadband signal 49 is applied, in our invention, we apply both a low frequency modulation ($\Delta V$), 42, of the amplitude V, 50, of the RF field. The RF field frequency, $W_0$, is approximately 1.050 MHz and the typical low frequency modulation, $W_2$, is preferably 300 Hz, although any frequency less than 2000 Hz is successful. The form of the modulation function can be sine, triangle, sawtooth, or any form that periodically changes the secular frequency of ions by changing the RF trapping voltage amplitude.

Generally speaking, it is well known in radio frequency engineering that amplitude modulation of an ac carrier signal $W_0$ by a sinusoidal modulation frequency (Δ) results in three frequencies, $W_0$, W+Δ and W−Δ. Accordingly, from first appearances, it would not appear to be particularly useful to amplitude modulate the RF field voltage because only two additional frequencies result which are equally spaced about the $W_0$ carrier. These two frequencies could more easily have been provided by the broadband supplementary frequency generator.

However, the amplitude modulation three frequency spectrum is not the mechanism underlying our invention. Rather, the slow variation of the voltage V changes the $q_z$ for each ion according to the equation qαV/M. Changing q will cause the value of $B_z$, and thus the secular frequency $W_s$ to change. Accordingly, this modulation results in an ability of those ions nearby in frequency to the frequencies in the calculated broadband supplemental waveform to be periodically brought into resonance with the supplemental frequencies and if the scan is slow enough to permit sufficient energy to be absorbed by those ions, it will cause their path to increase sufficiently for the ions to become ejected or to be lost on impact with the walls of the trap.

As seen in FIG. 4, for completeness, prior to the process of the invention, a rapid RF scan 48, known in the prior art, called "prescan" is applied to eject all ions trapped after ionization. These ions are collected and activate an Automatic Gain Control circuit (AGC) which is not part of this invention.

It is also noted in FIG. 4 that the electron bombardment 41 is gated on a few hundred microseconds 52 after the supplemental broadband waveform 49 is turned on and after the modulation 42 of the RF field is turned on. Alternatively, these could be turned simultaneously with the electron bombardment gate 41. After the gate 41 is turned off, the broadband waveform 49, and modulation 42 remain on for a small reaction period 51, followed by ramping of the RF field voltage 46 which can be applied to sequentially scan out the ions and obtain the mass spectrum of the ions in the trap, or other experiments can be carried out. Alternative methods of generating a mass spectrum could be employed such as scanned resonance ejection.

Figure 1:
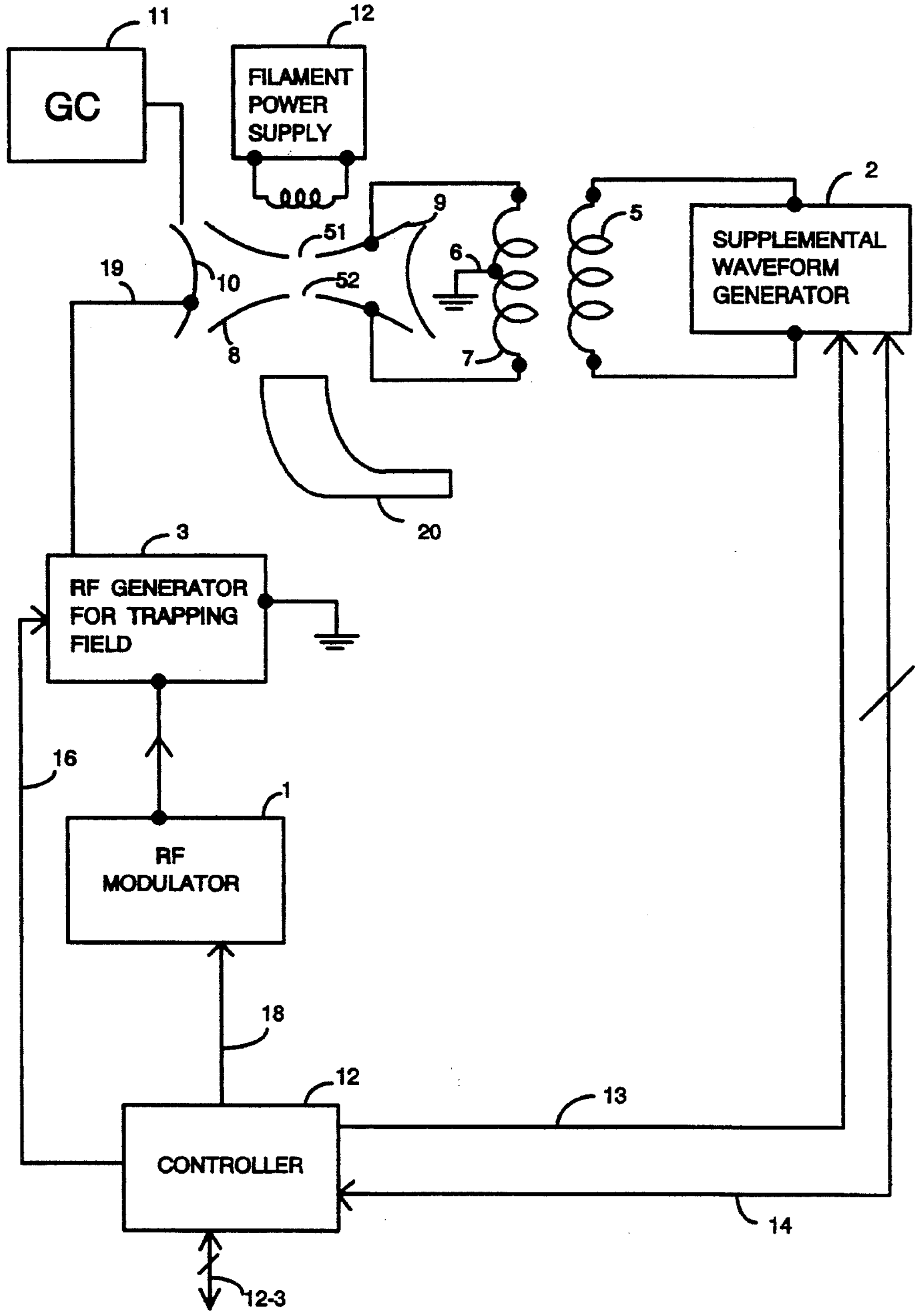
FIG. 1 is a block diagram of the equipment used to carry out the process of this invention.
Figure 2:
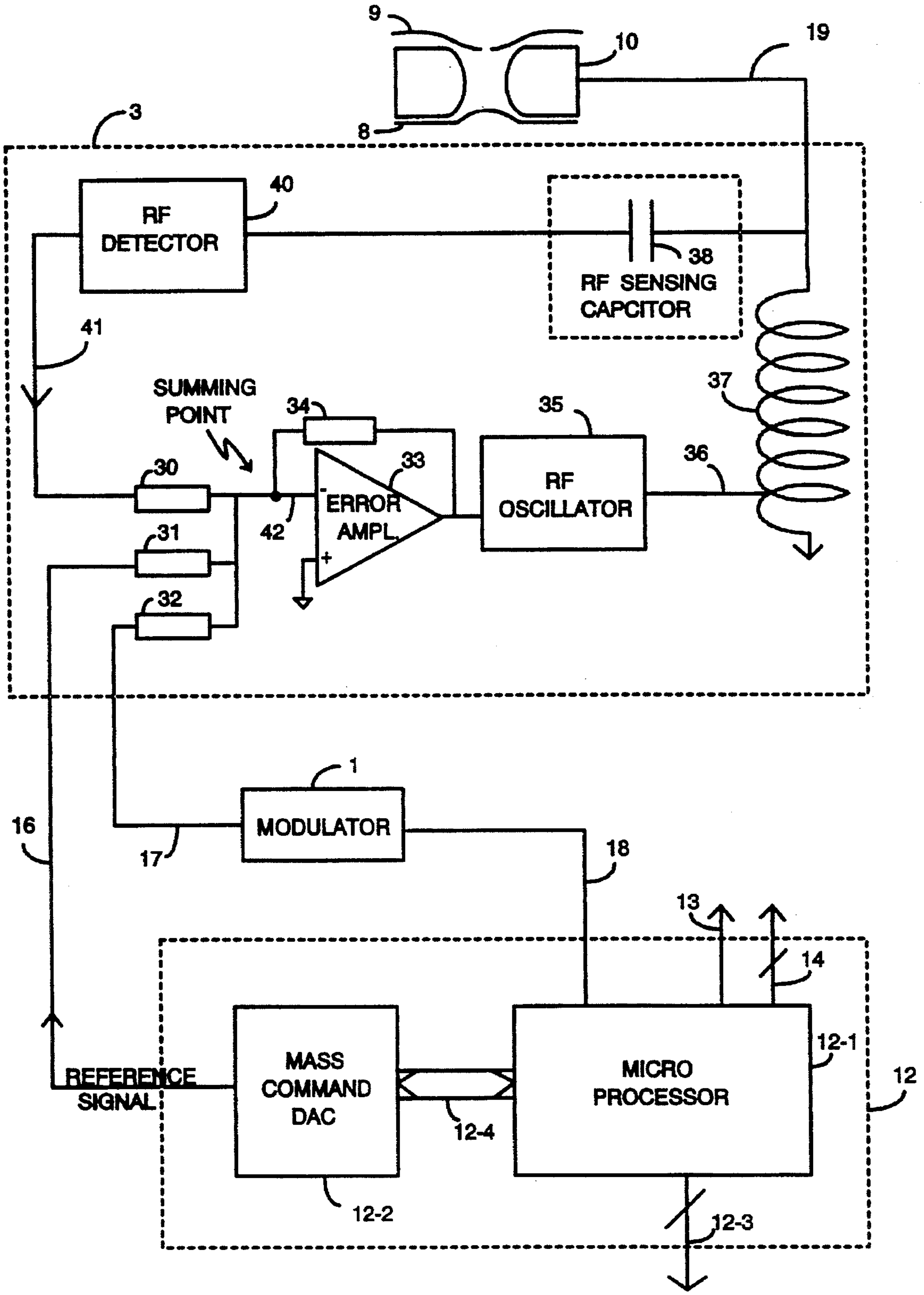
FIG. 2 is a block diagram of the modulation control apparatus.
Figure 3:
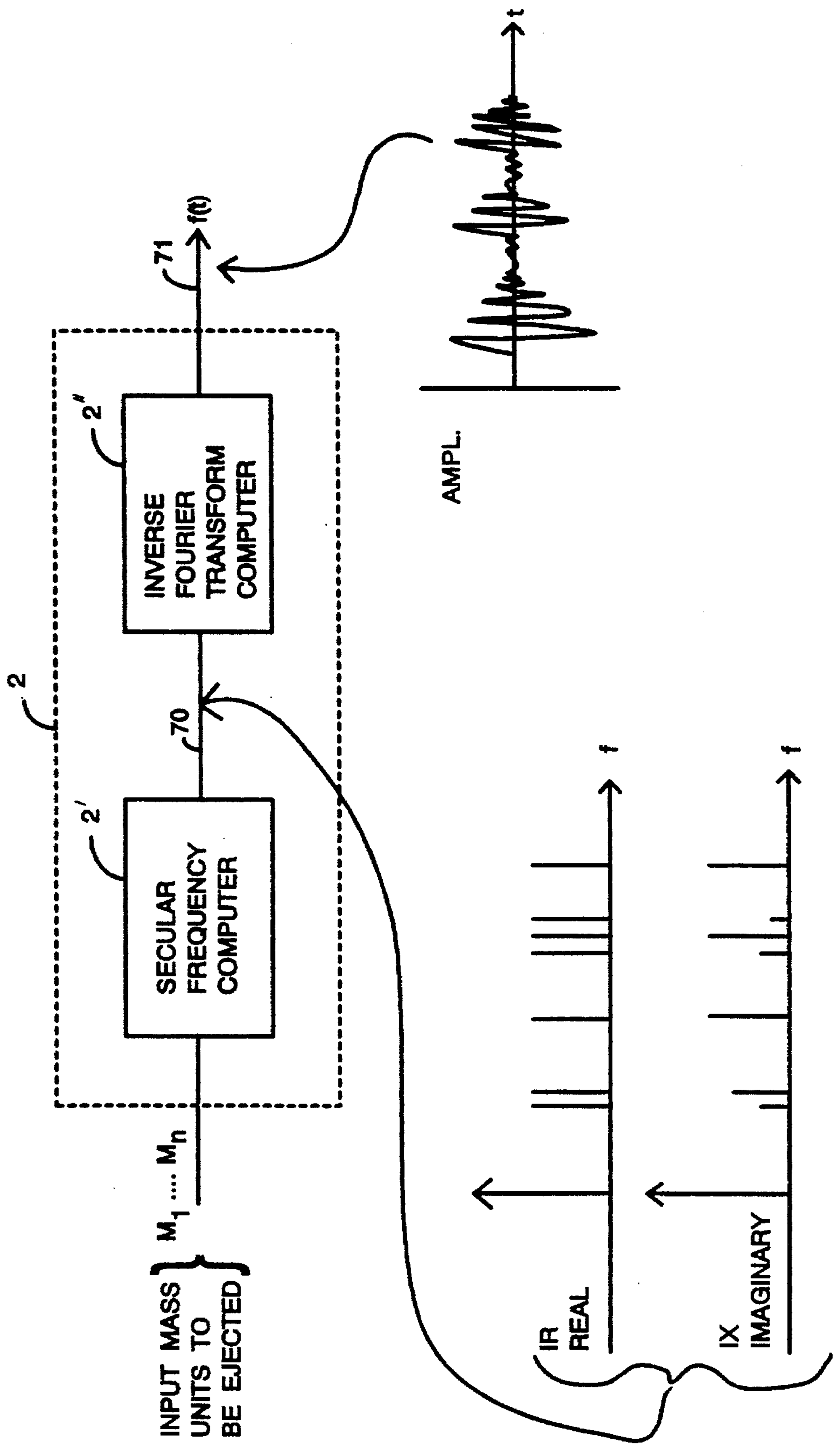
FIG. 3 is a block diagram of the Supplemental Waveform Generation process.

The apparatus of FIG. 1, FIG. 2 and FIG. 3 illustrates the equipment employed to carry out this invention.

With reference to FIG. 1, the apparatus to carry out this invention is seen to be similar to the apparatus described in my copending patent application Ser. No. 08/890,996 filed May 29, 1992, now U.S. Pat. No. 5,302,826. The entire modulation apparatus in the application Ser. No. 08/890,996, now U.S. Pat. No. 5,302,816, is for carrying out collisionally induced disassociation (CID). In our earlier CID case, the RF modulator was to gently excite a single parent ion to disassociate it into daughter ions. Also, in the instant invention, the supplemental broadband waveform calculated in generator 2 is to provide the frequencies to eject the unwanted original ions produced by electron bombardment.

With reference to FIG. 1, a gas chromatograph 11 is connected to the QIT and feeds its output directly into the trap between the ring electrode 10 and the pair of end caps 8 and 9. A filament and its power supply 12 are positioned to introduce an e-beam through the aperture in end cap 9. The vacuum pressure maintains a significant mean-free-path of the electron in the QIT to avoid swamping by interfering air gas ions. The detector 20 is mounted in the usual way to capture those ions ejected from the QIT during a scan.

Ions may be introduced to the trap by known alternative techniques such as laser desorption or by injecting ions into the trap from an external source.

Connected to the ring electrode 10 is the RF Generator 3 for providing the trapping field, i.e. 1050 MHz. The RF Generator is connected to RF Modulator 1. Also connected via line 16 to the RF Generator 3 is the controller 12 for enabling the RF Generator at the appropriate times during the desired sequence. Controller 12 also sequences the modulator 1 through connector 18. Coupled to the QIT end cap electrodes is a primary of coupling transformer 7 which has a center tap ground. The secondary winding 5 is connected to the Supplemental Waveform Generator 2, which preferably includes a means to provide a broadband output with user selected frequency components. The Supplemental Generator is coupled to the Controller 12 via line 13 for sequence timing control and via bus 14 for high data rate transfer to provide the desired frequency spectrum to the Broadband Generator 2. The Controller 12 is coupled to the user for input/output via bus 12-3.

The apparatus for modulating the RF Generator 3 is more fully disclosed in FIG. 2. This apparatus is the same as the apparatus described in my earlier patent application Ser. No. 08/890,996 filed May 29, 1992, which description is incorporated herein by reference. The modulator 1 provides one input to a summing point 42 via a resistor 32. The amplitude of the RF oscillator signal is controlled by the input from the DAC 12-2 via line 16 through resistor 31, and the third resistor 30 connected to point 42 is a feedback from the RF Detector 40.

The waveforms used for ejection can be created by several methods, such as was used in the prior art method of Marshall, which employs Inverse Fourier Transforms.

FIG. 3 illustrates the function of the Supplemental Waveform Generator 2. The function includes a secular frequency computer 2' and an inverse Fourier Transform computer, 2". The user provides the mass units to be ejected. The secular frequency computer provides the corresponding frequency and its phase and intensity to the transform generator which is preferably an inverse FT computer. By specifying the coefficients C=IR +jIX of the real and imaginary term for each such frequency, the phase and intensity are specified. The coefficients for each secular frequency are provided to the transform computer and the output 71 is a time domain f(t) excitation having the nominal secular excitation frequencies for the ions to be ejected.

The coefficients can be selected so that the amplitude is sufficient to eject the ion when it is on resonance, and the phase is selected so as to minimize the amplitude of the resulting composite waveform. In all cases the frequencies selected to form the waveform should be such that ions that are desired to be selectively trapped do not encounter a resonance with any component of the waveform at either extreme of the modulation cycle.

Figure 5:
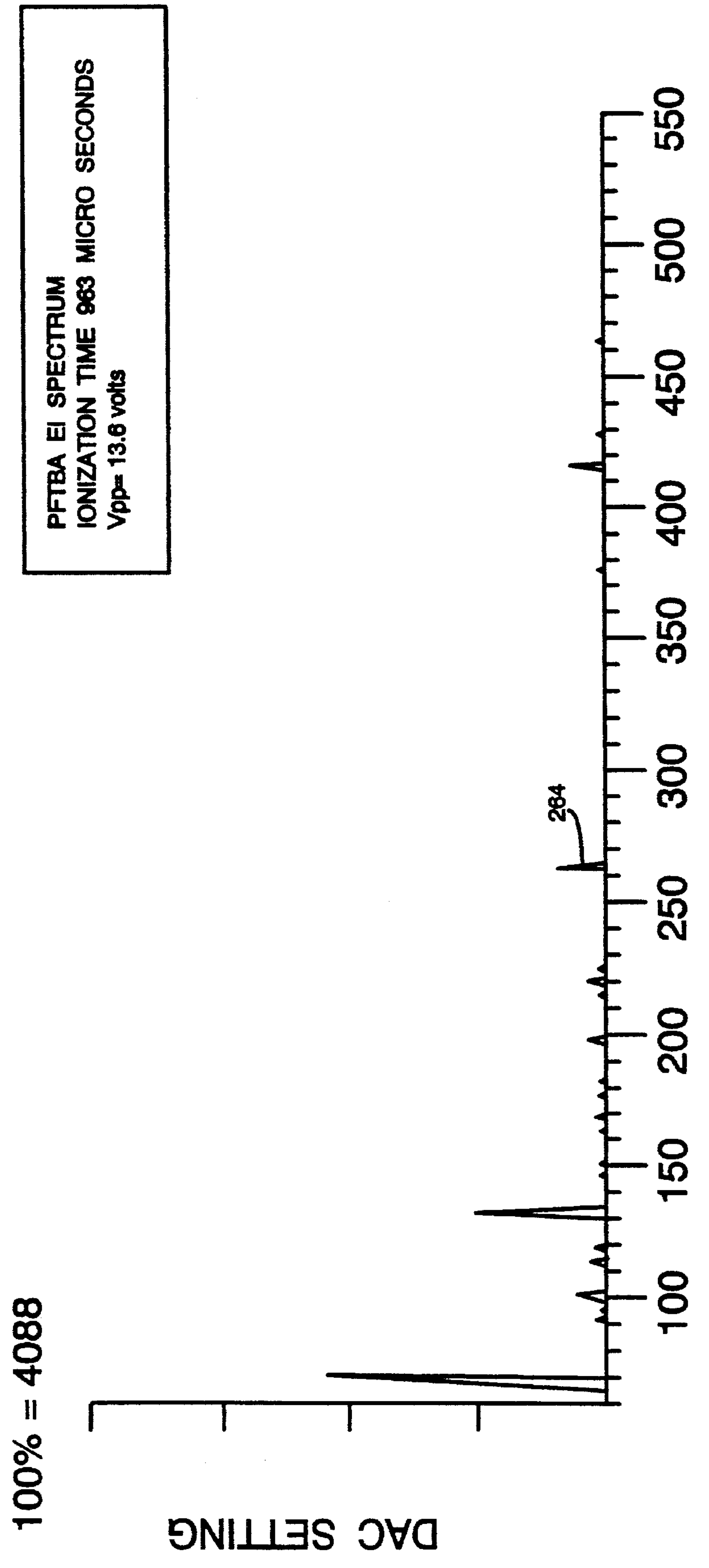
FIG. 5 is the normal QIT spectrum of PTFB calibration gas without the method of this invention.
Figure 6:
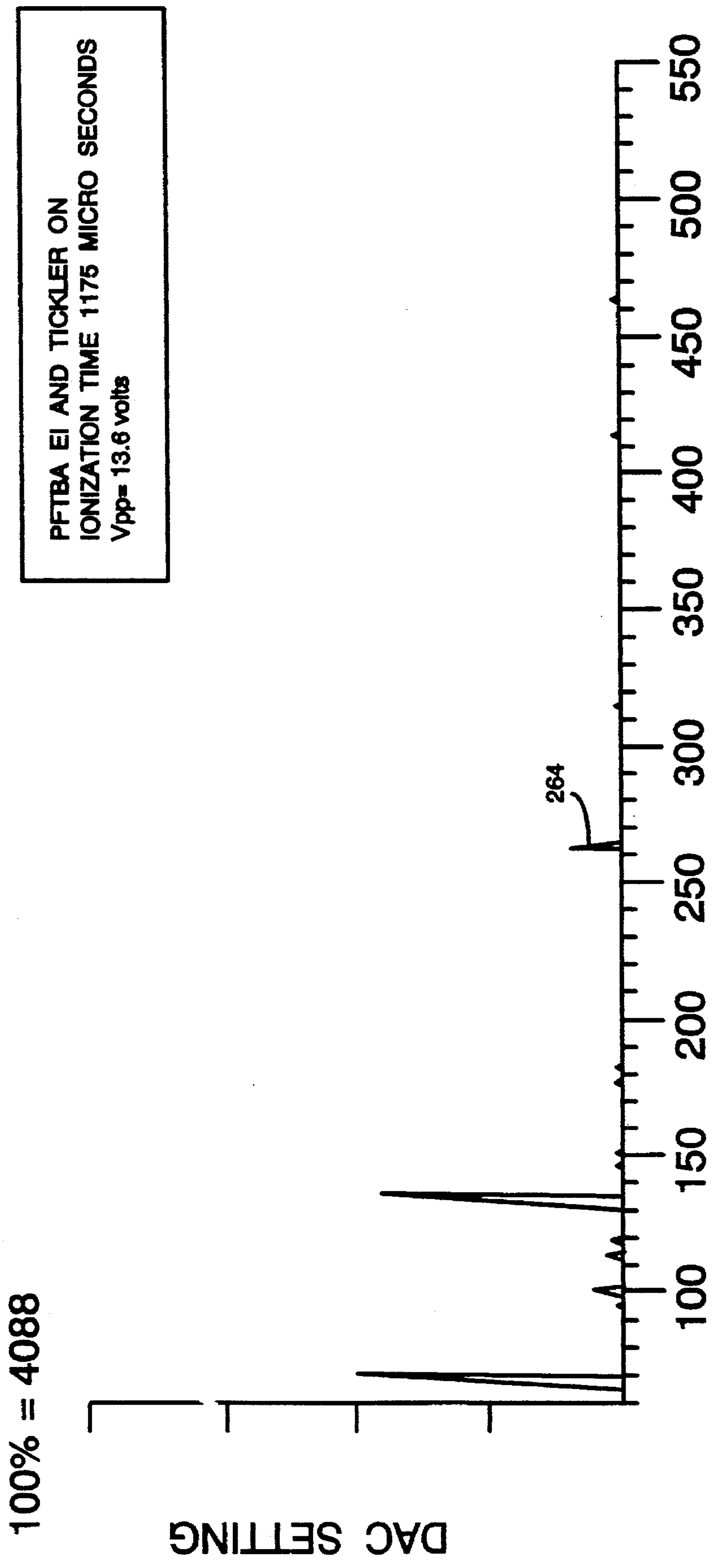
FIG. 6 is the QIT spectrum with application of a Supplemental Waveform for eight (8) frequencies corresponding to all lines except m/e= 264 but without RF modulation.
Figure 7:
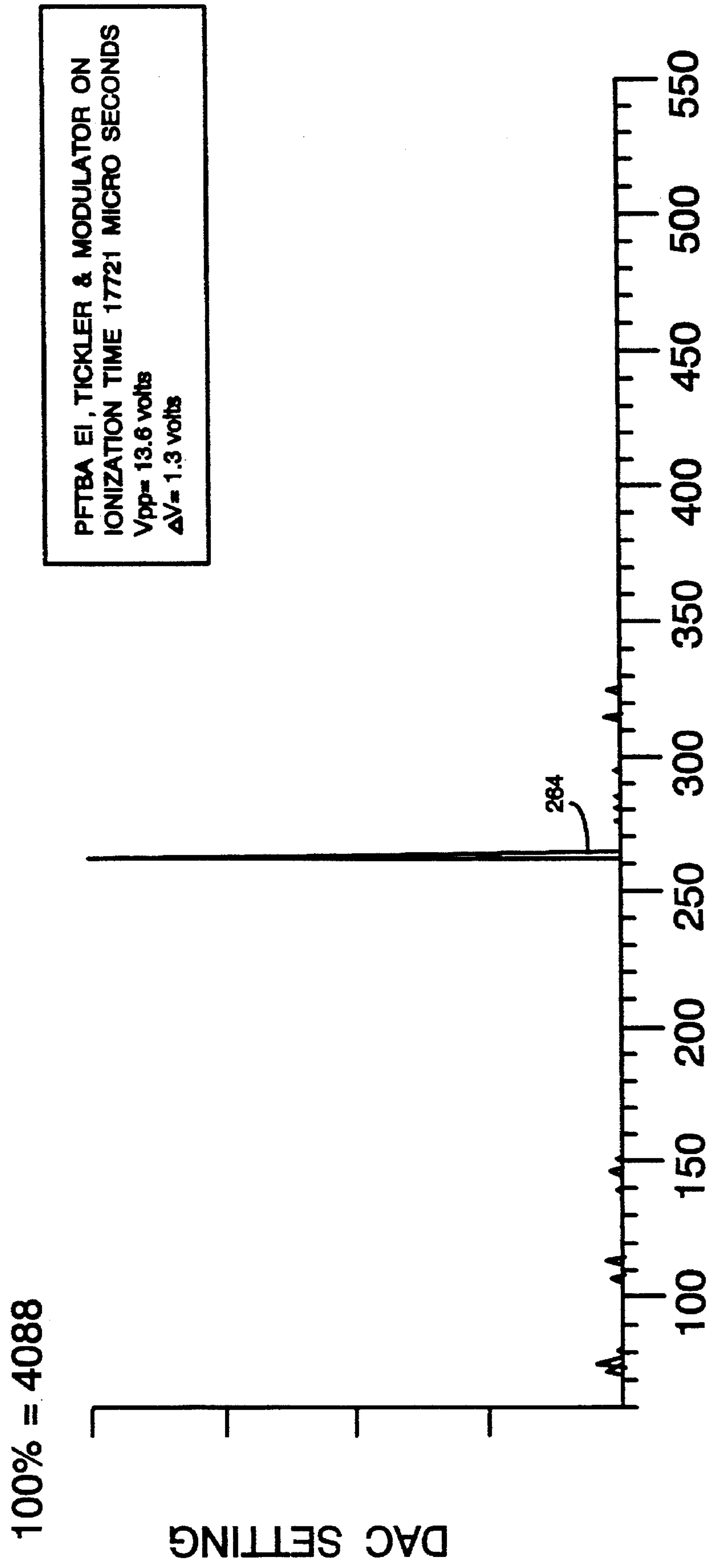
FIG. 7 is the spectrum for the same supplemental generator broadband waveform with the 300 Hz modulation of the RF trapping field.

The benefits of this invention are clearly seen by reference to FIGS. 5, 6 and 7. FIG. 5 shows the spectrum of PFTBA used as a calibration gas. In this experiment, the supplemental generator 2 and the modulator are de-energized and the PFTBA is fragmented by an e-beam, and all the resultant ions have been scanned out by a ramping trapping field waveform 46, such as illustrated in the upper portion of FIG. 4, without excitation by the modulator 42. The spectrum shows nine (9) distinct peaks. In FIG. 6, the spectrum of PFTBA is shown with the same parameters, except in this experiment the Supplemental Generator has been energized to provide a waveform containing eight of the nine frequencies. Specifically, no Frequency component is provided for the peak at m/e 264. It can be seen that there is a reduction in the intensity of the ions greater than 264, but that the lower mass ions were not efficiently ejected. For these experiments, the trapping field was adjusted so that the secular frequencies were approximately two mass units removed from the frequencies in the waveform of the supplemental generator. Also, in FIG. 6, the ionization time was increased from 963 μsec to 1175 μsec due to the reduction in the intensity of the higher mass. The supplemental generator is more effective at higher mass values due to the smaller spacing between secular frequencies of the adjacent masses. The supplemental waveform in FIG. 6 was applied during the AGC pre-scan, as well as during the analytical scan.

The spectra of FIG. 7 was obtained with the modulator 1 energized at 300 Hz as shown in FIG. 4. The modulation ΔV amplitude provides a scan over a range of several mass units. It can be seen that almost all ions except for m/e=264 have been ejected. The ionization time was increased by a factor of 20 to 17,721 μsec for the experiment of FIG. 7.

It has been found that the technique is successful to improve the isolation for a modulation frequency up to several thousand Hz. Decreasing the mass range, i.e. increasing the RF modulation amplitude ΔV, increases the duty cycle of the modulation. Modulation ΔV of the mass range around the nominal mass as small as ±0.5 mass units has proven to be effective. Increasing the modulation amplitude also allows the use of fewer frequency components in the supplemental waveform by increasing the mass range coverage by those applied frequency components.

It is pointed out that the description above is in connection with the preferred embodiments. However, the invention is not limited to these particular embodiments and the scope of the invention should be determined by claims. With the above in view.

What is claimed is:

1. In a method for filling a quadrupole ion trap (QIT) with a preselected mass range of ions, said QIT having a ring and end cap electrodes, including the steps of:

(a) introducing a sample gas in said QIT;

(b) applying RF trapping voltage V(t) to said ring electrode at radio frequency $W_0$, said applying step (b) taking place simultaneously with at least a portion of the time that step (a) introduction of said sample gas is taking place;

(c) adjusting said RF trapping voltage amplitude to eject all ions below a certain mass range;

(d) applying a selected broadband supplemental voltage to said end caps, said broadband supplemental voltage having frequencies close to the nominal secular frequency of those ions of said sample which are to be ejected, said broadband supplemental voltage being applied during the period of step (b) that said RF trapping voltage is applied;

THE IMPROVEMENT COMPRISING (e) modulating the amplitude of said RF trapping voltage simultaneously with at least a portion of step (d) so that the potential field in said trap periodically has a frequency component which equals the secular frequency of the ions to be ejected.

2. The method of claim 1 wherein the step of modulating the amplitude of said Rf trapping voltage includes selecting the modulation frequency $W_1$ wherein $W_1$ is less than 2000 Hz;

3. The method of claim 2 wherein $W_1$ is approximately 300 Hz.

4. The method of claim 3 wherein the modulation amplitude ΔV is less than the equivalent of plus and minus two mass units around a said selected mass.

5. The method of claim 4 wherein said selected broadband supplemental voltage waveform is computed in response to an input from the user specifying the mass units to be ejected.

6. The method of claim 5 wherein said computation in response to said input of said mass units to be rejected includes computation of the nominal secular frequency $W_s$ for each said mass unit corresponding to the nominal RF trapping field voltage according to the equations:

$W_s=B_zW_0/2$ where $B_z$=function $(a,q_z)$ and where $q_z=4eV/mW^2{}_0r_0{}^2$ and where e=electronic charge, m=particle mass, and a=DC potential applied to the field.

7. The method of claim 5 wherein said computation further includes an inverse Fourier Transformation to a broadband time domain response corresponding to said nominal secular frequencies.

8. The method of claim 4 wherein said selected broadband supplemental voltage is computed in response to an input from user specifying the mass units to be retained in the QIT.

9. The method of claim 8 wherein said computation further includes an inverse Fourier transformation and provides a broadband time domain response corresponding to said nominal secular frequencies to eject unwanted ions.

10. The method of claim 4 where in said selected broadband supplemental waveform is computed responsive to an input from a user specifying both the mass units to be saved and the mass units to be ejected.

11. The method of claim 1 wherein the amplitude ΔV of modulation results in resonance ejection for a mass range less than the equivalent of plus and minus two mass units around a selected mass to be ejected when said modulation amplitude is equal to zero.

12. The method of claim 11 wherein the modulation amplitude ΔV is approximately plus and minus the equivalent of 0.5 mass units around a said selected mass.

13. The method of claim 11 including a first and said selected second mass to be ejected, each said first and second mass having an adjacent mass range in which ions are ejected responsive to said ΔV modulation, wherein the number of mass units in said adjacent mass range being ejected around said first selected mass to be ejected does not equal the number of mass units in said adjacent mass range around said second selected mass to be ejected since $V\alpha(q_z * m)$ and $q_z$ is not a constant.

14. The method of claim 1 wherein said step of introducing comprises forming sample gas ions in the ion trap.

15. The method of claim 1 wherein said step of introducing comprises injecting sample gas ions into the ion trap.

16. A new use of a QIT system having a ring electrode and a pair of end cap electrodes enclosing a trapping volume containing gases, said QIT system further including an RF Generator for the trapping field, and e-beam source, a supplemental generator coupled to said end caps, an RF modulator coupled to said RF generator for modulating the amplitude of said RF trapping field, and a controller for synchronizing the system and for communicating with external peripheral equipment, said new use comprising:

(a) simultaneously periodically modulating said RF trapping field voltage at a slow rate and bombarding with said e-beam source the gases in said QIT; and (b) applying a selected broadband supplemental waveform to said QIT end caps where said selected broadband supplemental waveform is generated to include a frequency to match the nominal secular frequency of each ion it is desired to be ejected from said QIT at one of the values of said RF trapping field in said modulation period.

* * * * *